May 30, 1950  T. A. HILL  2,509,768
SELF-LOCKING AND WIRE-PROTECTING NUT FOR CONDUITS
Filed Jan. 10, 1945

Inventor:
THOMAS A. HILL
By James C. Marble
his Attorney

Patented May 30, 1950

2,509,768

UNITED STATES PATENT OFFICE 2,509,768

SELF-LOCKING AND WIRE-PROTECTING NUT FOR CONDUITS

Thomas A. Hill, West Orange, N. J.

Application January 10, 1945, Serial No. 572,241

3 Claims. (Cl. 16—108)

This application is a continuing application consolidating subject matter divided out from my co-pending applications Serial No. 525,409 filed March 7, 1944, now abandoned, and Serial No. 546,348 filed July 24, 1944, now abandoned.

The present invention relates to fastening devices and has particular reference to nuts. Still more particularly the invention relates to nuts particularly adapted for use in connection with electric conduits and has for its general object the provision of a novel form of structure which will provide a self-locking feature and which will also insure against injury by cutting or abrasive action of electrical wiring emerging from conduits with which the device is employed.

For a better understanding of the more detailed nature of the invention, the manner in which it is carried into effect and the advantages to be derived from its use, reference may best be had to the ensuing portion of this specification, taken in conjunction with the accompanying drawings, in which various embodiments of the invention are described and illustrated by way of example but without limitation. In the accompanying drawings, Fig. 1 is a view partly in section and partly in elevation of a device embodying the invention;

Figure 1:
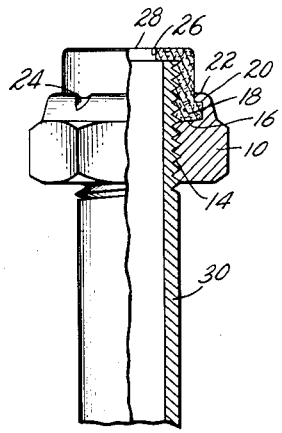
Figure 2:
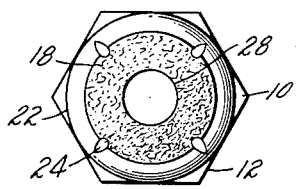
Fig. 2 is a top plan view of Fig. 1.

Referring now more particularly to Figs. 1 and 2, the device comprises a nut 10, the body of which is externally of hexagonal form to provide wrench engaging flats 12. The external configuration of the nut may be of another form. The nut is provided with the usual internally threaded bore 14 and at the top of the nut body a counterbore is formed to provide a recess 16 for the reception of the base of a locking insert 18. The insert is held against movement relative to the nut body by a flange 20 formed integrally as a part of the nut body and having its outer end inturned as at 22 to form a retaining lip or rim engaging a suitable shoulder on the locking insert. The rim 22 is advantageously indented as at 24 to bite into the material of the insert and thereby prevent its turning in the recess.

The insert is made from non-metallic elastic material, such as compressed fiber or the like, and has a bore in alignment with the threaded bore 14 of the nut body and so located as to have a thread impressed in it by a threaded element screwed through bore 14. At its outer end the insert is formed with an inturned flange or rim 26 adapted to serve as a stop or abutment for masking the end of a tubular element such as a pipe or conduit on which the nut is threaded. The flange 26 is annular in form, providing the central opening 28.

The operation of the device is apparent from Fig. 1 in which the nut is shown threaded over the end of a pipe or conduit 30. When the nut is threaded in place the threaded end of the conduit impresses a thread in the bore of the insert or bushing and due to the compression resulting from the impression of the thread and the elastic nature of the material of the insert, the pipe threads are tightly gripped to lock the nut against the backing off under the influence of vibration. When threaded in place, the inturned or flange end of the insert or bushing serves as an abutment masking the end of the pipe which, if of the usual nature employed in electrical wiring installations, is likely to be rough or burred to an extent such that it would be likely to chafe or cut the relatively soft insulation covering the wires passing through the pipe and emerging from its end, since the material of the insert or bushing is relatively softer than metal and can readily be formed with an opening which has a smooth wall. Wires can be passed through it without danger of subsequent injury or wear through abrasive or cutting action.

Figure 3:
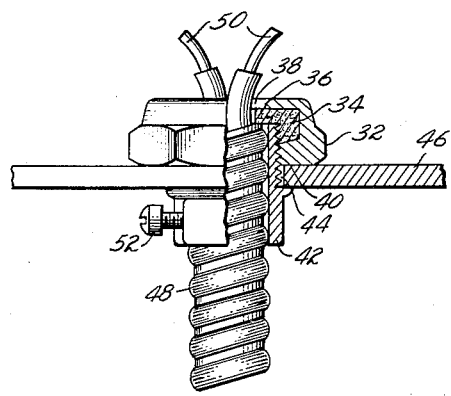
Fig. 3 is an elevation partly in section showing another application of the invention.
Figures 4, 5, 6:
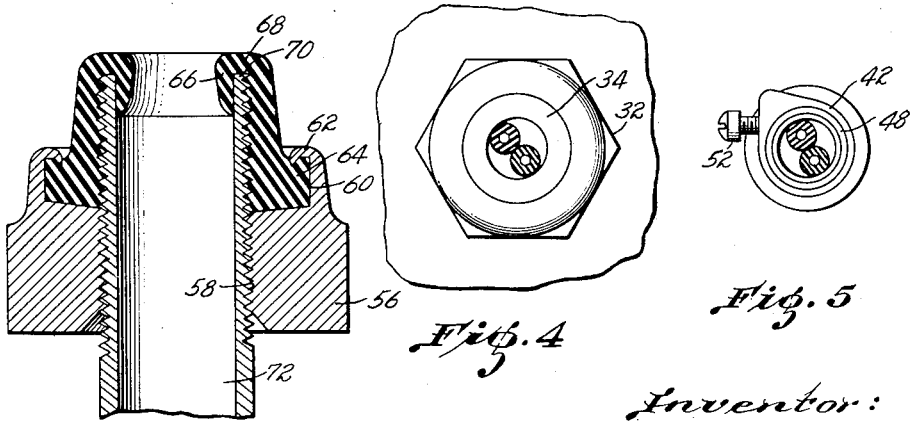
Fig. 4 is a top plan view of Fig. 3.
Fig. 5 is a bottom plan view of Fig. 3.
Fig. 6 is a sectional view of still another embodiment.

Referring now to Figs. 3 to 5, the application of the invention to an insulation where wiring is brought into a junction box or the like is shown. In this form of the invention the nut body 32 entirely encompasses the bush 34, the wall of the nut being inturned to provide a retaining flange 36 overlying the top of the insert and being carried inwardly to an extent such that the diameter of the opening 38 is substantially less than the diameter of the threaded bore 40 in the body of the nut.

As shown in Fig. 3, the nut is screwed on a threaded and flanged thimble 42 passing through an aperture 44 in the wall 46 of a junction box or the like, the flexible conduit 48 carrying the insulated wire 50 passing through the thimble and being held in known manner by a suitable set screw 52. As will be seen from the drawing, the flange or abutment of the insert is given substantial axial support by the inturned flange 36 of the nut body and the insert flange is carried inwardly sufficiently far so as to protect the insulation on the wires from contact with the ends of the thimble 42 and the conduit 48.

Figure 7:
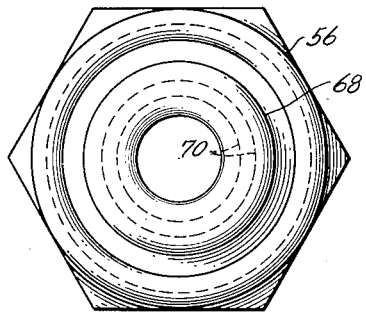
Fig. 7 is a top plan view of Fig. 6.

In the embodiment shown in Figs. 6 and 7, the nut body 56 is provided with threaded bore 58 and recess 60 similar to the construction illustrated in Figs. 1 and 2, the flange at the top of the nut being inturned at 62 to grip the base of an insert or bush 64 of non-metallic material molded or otherwise suitably formed to provide an internal bushing portion 66 depending from the inturned flange portion 68 so that an annular groove or recess 70 is provided for receiving and entirely enclosing the end of the pipe or conduit 72 on which the nut is threaded.

From the foregoing, it will be apparent that the principles of the invention may be carried into effect in numerous different kinds of devices having widely varying specific forms and characteristics and the invention is therefore to be considered as embodying all the devices falling within the scope of the appended claims.

What is claimed:

1. A device of the character described comprising a metallic body providing a threaded bore portion and a recess at one end of said bore portion, and an insert of non-metallic elastic material fixed in said recess, said insert having a bore aligned with said threaded bore portion and located to be traversed and have a thread impressed in it by an externally threaded member screwed through said bore portion, and said insert further having an inturned flange at its outer end extending radially inwardly a sufficient distance to provide an abutment for masking the externally threaded member.

2. A device as set forth in claim 1 in which the insert is provided with a base portion located in said recess and clamped therein by a flange forming a part of said metallic body and projecting axially beyond said metallic body.

3. A device as set forth in claim 1 in which the insert is entirely within said metallic body and is held against axial displacement by an inturned flange overlying the top of the insert and providing a reinforcement for the inturned portion of the insert.

THOMAS A. HILL.

REFERENCES CITED

The following references are of record in the file of this patent:

UNITED STATES PATENTS

| Number | Name | Date |
|---|---|---|
| 240,892 | Courtenay | May 3, 1881 |
| 672,589 | Bossert | Apr. 23, 1901 |
| 1,976,817 | Walker | Oct. 16, 1934 |
| 2,326,681 | Richardson | Aug. 10, 1943 |
| 2,336,791 | LaBarre | Dec. 14, 1943 |
| 2,338,316 | Buzzell | Jan. 4, 1944 |
| 2,342,317 | Wikstrom | Feb. 27, 1944 |

FOREIGN PATENTS

| Number | Country | Date |
|---|---|---|
| 206,275 | Great Britain | Nov. 8, 1923 |